(12) United States Patent
Ackerman et al.

(10) Patent No.: US 10,939,606 B2
(45) Date of Patent: Mar. 9, 2021

(54) SCOUTING SYSTEMS

(71) Applicant: DEERE & COMPANY, Moline, IL (US)

(72) Inventors: Chad A. Ackerman, Urbana, IL (US); Scott A. Stephens, Carefree, AZ (US); Dolly Wu, Carrollton, TX (US); David S. Mercer, W Des Moines, IA (US); Mark A. Harris, Blue Grass, IA (US)

(73) Assignee: Deere & Company, Moline, IL (US)

( * ) Notice: Subject to any disclaimer, the term of this patent is extended or adjusted under 35 U.S.C. 154(b) by 186 days.

(21) Appl. No.: 16/188,428

(22) Filed: Nov. 13, 2018

(65) Prior Publication Data

US 2019/0082582 A1 Mar. 21, 2019

Related U.S. Application Data

(62) Division of application No. 14/921,217, filed on Oct. 23, 2015, now Pat. No. 10,165,722.

(Continued)

(51) Int. Cl.
*A01B 69/04* (2006.01)
*G01S 19/48* (2010.01)
(Continued)

(52) U.S. Cl.
CPC .............. *A01B 69/008* (2013.01); *G01S 5/16* (2013.01); *G01S 19/48* (2013.01); *G05D 1/024* (2013.01);
(Continued)

(58) Field of Classification Search
CPC ......... A01B 69/008; G01S 5/16; G01S 19/14; G05D 1/0225; G05D 1/024; G05D 1/0274;
(Continued)

(56) References Cited

U.S. PATENT DOCUMENTS 6,445,983 B1 9/2002 Dickson et al.
7,142,150 B2 11/2006 Thackray
(Continued)

FOREIGN PATENT DOCUMENTS

CN 1936919 A 3/2007

OTHER PUBLICATIONS

Blanke, M., et al. "Autonomous Robot Supervision Using Fault Diagnosis and Semantic Mapping in an Orchard." Fault Diagnosis in Robotic and Industrial Systems, 2012, pp. 1-22 [online], [retrieved on Aug. 21, 2014]. Retrieved from the Internet: <http://orbit.dtu.dk/fedora/objects/orbit:75755/datastreams/file_6ae7977a-d70f-405f-ae26-a7debee5cdec/content>.

(Continued)

*Primary Examiner* — Gertrude Arthur Jeanglaude (57) ABSTRACT

A scouting system can include an autonomous ground vehicle having a perception sensor and a motion sensor to construct an occupancy grid referenced to a coordinate system of the autonomous ground vehicle. The autonomous ground vehicle is configured to use information from the occupancy grid to detect crop rows in a crop field. The autonomous ground vehicle is configured to identify and classify one or more non-crop plant in-lier objects arranged within the crop rows and generate an output signal received by an external vehicle to cause the external vehicle to perform a task when the one or more non-crop plant in-lier objects are identified within the crop rows.

10 Claims, 8 Drawing Sheets

Related U.S. Application Data (60) Provisional application No. 62/088,235, filed on Dec. 5, 2014.

(51) Int. Cl.
  *G01S 5/16* (2006.01)
  *G05D 1/02* (2020.01)
  *G01S 19/14* (2010.01)

(52) U.S. Cl.
  CPC ......... *G05D 1/0225* (2013.01); *G05D 1/0274* (2013.01); *G01S 19/14* (2013.01); *G05D 1/027* (2013.01); *G05D 1/0272* (2013.01); *G05D 2201/0201* (2013.01); *G05D 2201/0207* (2013.01)

(58) Field of Classification Search
  CPC ................. G05D 1/027; G05D 1/0272; G05D 2201/0201; G05D 2201/0207
  USPC .......................................................... 701/25
  See application file for complete search history.

(56) References Cited

U.S. PATENT DOCUMENTS

| | | | |
|---|---|---|---|
| 7,499,775 B2 | 3/2009 | Filippov et al. | |
| 7,570,783 B2 | 8/2009 | Wei et al. | |
| 7,580,549 B2 | 8/2009 | Wei et al. | |
| 7,610,123 B2 | 10/2009 | Han et al. | |
| 7,684,916 B2 | 3/2010 | Wei et al. | |
| 7,792,607 B2 | 9/2010 | Han et al. | |
| 8,150,574 B2 | 4/2012 | Han et al. | |
| 8,737,720 B2 | 5/2014 | Mas et al. | |
| 8,855,405 B2 | 10/2014 | Mas et al. | |
| 9,030,549 B2 | 5/2015 | Redden | |
| 9,064,173 B2 | 6/2015 | Redden | |
| 9,313,944 B1 | 4/2016 | Faivre et al. | |
| 10,165,722 B2 * | 1/2019 | Ackerman | A01B 69/008 |
| 10,395,115 B2 * | 8/2019 | Kumar | H04N 13/282 |
| 2003/0229435 A1 | 12/2003 | Van der Lely | |
| 2007/0005306 A1 | 1/2007 | Foessel | |
| 2007/0271013 A1 | 11/2007 | Jochem et al. | |
| 2009/0198381 A1 | 8/2009 | Friedman et al. | |
| 2013/0325242 A1 | 12/2013 | Cavender-Bares et al. | |
| 2015/0027040 A1 | 1/2015 | Redden | |
| 2015/0142250 A1 | 5/2015 | Cavender-Bares et al. | |
| 2015/0245565 A1 | 9/2015 | Pilgrim et al. | |
| 2016/0255778 A1 | 9/2016 | Redden et al. | |
| 2017/0336787 A1 | 11/2017 | Pichlmaier et al. | |

OTHER PUBLICATIONS

Emmi, L., et al. "New Trends in Robotics for Agriculture: Integration and Assessment of a Real Fleet of Robots." The Scientific World Journal, Mar. 30, 2014, pp. 1-21 [online], [retrieved on Jan. 19, 2016]. Retrieved from the Internet: <http://www.hindawi.com/journals/tswj/2014/404059/>.

Hamner, B., et al. "Improving Orchard Efficiency with Autonomous Utility Vehicles." American Society of Agricultural and Biological Engineers Annual International Meeting, Jun. 2010, pp. 1-16 [online], [retrieved on Aug. 21, 2014]. Retrieved from the Internet: <https://elibrary.asabe.org/azdez.asp?JID=5&AID=29902&CID=pitt2010&T=2>.

Wang, P., et al. "Path Recognition for Agricultural Robot Vision Navigation under Weed Environment." Computer and Computing Technologies in Agriculture VII, Springer Berlin Heidelberg, 2013, pp. 242-248 [online], [retrieved on Aug. 21, 2014]. Retrieved from the Internet: <http://link.springer.com/chapter/10.1007/978-3-642-54344-9_30#page-1>.

Zhang, J., et al. "Mapping Orchards for Autonomous Navigation." American Society of Agricultural and Biological Engineers Annual International Meeting, Jul. 2014, pp. 1-9 [online], [retrieved on Aug. 21, 2014]. Retrieved from the Internet: <https://www.ri.cmu.edu/pub_files/2014/7/ASABE_2014.pdf>.

Subramanian, Vijay; "Development of machine vision and laser radar based autonomous vehicle guidance systems for citrus grove navigation"; 2006; Computers and Electronics in Agriculture; issue 53; pp. 130-141.

\* cited by examiner

SCOUTING SYSTEMS

RELATED APPLICATIONS

This patent application is a divisional of U.S. patent application Ser. No. 14/921,217, filed Oct. 23, 2015, titled SCOUTING SYSTEMS, which claims the benefit of U.S. Provisional Patent Application No. 62/088,235, filed Dec. 5, 2014, titled SCOUTING SYSTEMS, which are hereby incorporated by reference in their entirety.

FIELD OF THE DISCLOSURE

This disclosure relates generally to the control and design of scouting systems for liquid spraying systems and other agricultural machines.

BACKGROUND OF THE DISCLOSURE

Since ancient times, some industries including the agricultural industry have long felt goals of remote controlled operations, robotic or fully-self autonomous operations. Sensors and Global Positioning System (GPS) often play a role to determine the location of the equipment or vehicle and the surrounding environment. For example, a tractor or sprayer vehicle has electronic circuits to detect its location via GPS and cameras to look ahead for obstacles. However, the vehicles are tall and far from the ground and may not be able to identify things close to the ground, or not do things like selective weeding or moisture sampling. Even if the cameras are mounted nearer to a ground location (e.g. to a fender of a tractor), their vision may still be obscured by the crop leaf canopy. Ground robots are being developed but they again rely on GPS to identify the location. When the crops grow tall enough, the moisture in the leaves throw off GPS location measurements and the leaves obscure a camera's view so that robots become unable to accurately identify its location to conduct mapping or associate test samples with a location. Further GPS may also be unavailable in remote areas, certain countries or time of day. These issues and others are addressed by the embodiments of this disclosure.

SUMMARY OF THE DISCLOSURE

Embodiments of an intelligent scouting system include a buddy system such as a ground scout and an air scout (e.g. drone) that communicate their findings with each other. The ground scout has an ability to identify the location of rows of crops and the end of the rows so that it can navigate, but in other embodiments, the ground scout can also rely more on the drone to navigate, to act as a communication relay system, and so on. In one embodiment, the buddies work individually or together; in other embodiments, they run ahead or behind of and work in coordination with a tractor or a sprayer vehicle. In order to be recharged, they are stored or docked on a tractor or sprayer. The buddies have these and other baseline capabilities so that they can carry out more complex tasks such as improve crop yield. The buddies have complementary capabilities; together, they can perform many types of tasks, some of which may otherwise be difficult for only one type of scout, alone, to perform. Other operation modes, features and embodiments are disclosed in the detailed description, accompanying drawings and claims.

BRIEF DESCRIPTION OF THE DRAWINGS

The details of one or more implementations are set forth in the accompanying example drawings, the description and claims below.

DETAILED DESCRIPTION

Human beings have certain basic capabilities in order for them to perform higher level and more complex tasks. Likewise, disclosed embodiments describe robotic scouts, and for a buddy system with a ground scout and an air scout or drone that include baseline capabilities. The buddy system extends the types of achievable tasks, some of which may otherwise be difficult for only one type of scout, alone, to perform. The ground scout can soil sample, sense moisture, identify crop row or boundary, recognize patterns, i.e.—see, smell, hear, taste, touch, move, calculate, and communicate. In some embodiments, the air scout operates as a roving communications cellular tower, have GPS or local coordinates, obtain the weather conditions, and so on. Once endowed with baseline capabilities, the buddy scouts ("buddies") can perform complex tasks such as soil, moisture, weed, and insect sampling and then mark or map the location. For example, some weeds and insects are abundant late in the growing season, hiding among the plants that are already tall and leafy so that a ground scout can rely on its crop row identification algorithms to figure out the position of the weeds or insects. On the other hand, large bands of damaged crops can be readily identified from an air surveillance by the drone that lets the scout know where best to start among the entire field. Thus, the buddies can work together or direct each other to perform certain tasks. The buddies or one of the types of scouts can also identify ditches, rough terrain, boundaries and so on to alert an operator or to guide the tractor or sprayer vehicle. Alternatively, the vehicle can guide and command the scout and drone to perform various tasks.

Alternatively, in remote areas or where GPS is unavailable even to the drone or tractor/sprayer vehicle, the ground scouts may work independently in real time and then correspond with the drone or sprayer. For example, in one embodiment, the scout utilizes sensor inputs to identify its own location, then makes a transformation of its position in its coordinate system to a more global map or to the farm field coordinates to identify the location of weeds, hazardous objects (e.g. rocks, animal), ground moisture, etc., and then advise a sprayer vehicle where to spray or pre-maps problem areas on the ground. In this disclosure, GPS refers to any sensor or device that detects position, GNSS, RTK, Galileo, GLONASS, Compass, and so on.

In embodiments involving bigger systems, one drone associates with several ground scouts or there are many pairs of buddies. In the case of an agricultural setting, the buddy system can also operate on its own or performs preliminary work before the tractor or sprayer gets in the field. The drone and scout can also either run ahead of and/or follow a sprayer to verify whether a spray job has been performed well.

Figure 1:
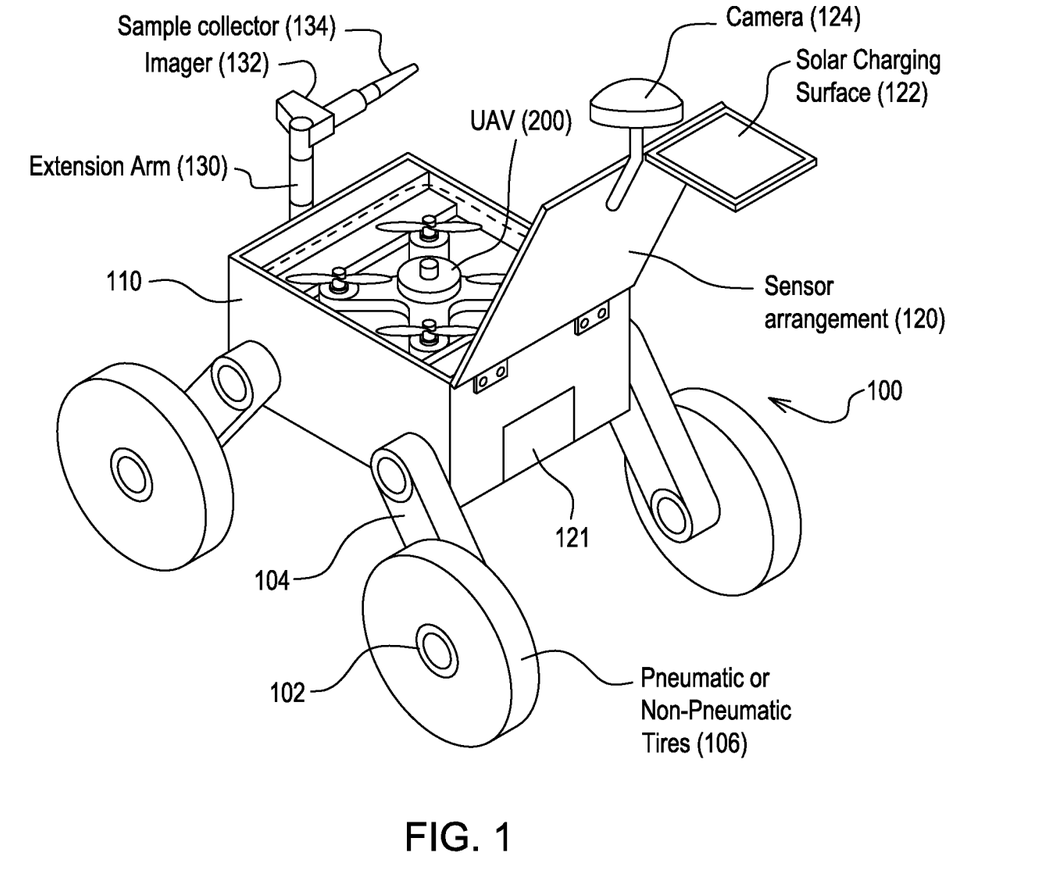
FIG. 1 depicts an embodiment of a ground scout and aerial drone.

Embodiments of the physical features include the following:

FIG. 1 depicts an example embodiment of a ground scout ("scout" 100) with an air scout ("drone" 200) docked on top of the scout 100. In an example outer appearance, scout 100 resembles a Deere Tango E5 autonomous mower (also see U.S. Pat. No. 9,026,299), but the wheels 102 are at least 5 inches in diameter and visible. Tucked underneath the body 110, the wheel legs 104 are tall, long, rotatable and extendable to 5 inches in height in order for scout 100 to clear debris and rough soil surface. Because the legs 104 are extendable, the scout 100 is able to walk or climb out of small valleys and ruts by moving one leg 104 at a time, bend that leg, apply force and climb up. The wheels 102 include tires 106 made of plastic or rubber and inflated like standard automobile tires or army tank tires with deep grooves for all terrain conditions. Alternatively, the tires 106 are made of composite materials and are tweel (turf) airless radials that are low maintenance (e.g. no flat tires), handle bumps well and cause less compaction. The spokes of the wheel are deformable for the tweel tires. In other embodiments, the side wheels 102 are grouped together similar to those of tanks; or each of the four wheels 102 is an individual tank (continuous track) wheel that is triangular or trapezoidal.

The width of scout 100 ranges from 15-20 inches in order to fit within and navigate the approximately 20 or 30 inch row spacing between crops such as corn and wheat, and still be able to dock a drone 200 that is about a foot in width and length. For vineyards and vegetable farms, the width between the rows is larger so that the ground scout 100 can be wider. The length of scout 100 is 20-30 inches, which is large enough to carry the electronics and a drone 200 (e.g. quadcopter is 12×15×6 inches). Scout 100 can be dimensioned tall or long enough to carry many battery packs or solar panels and thus can operate for a half day to a day. In other embodiments, scout 100 has dimensions and features similar to that of a Mars rover except for the solar panels; in some embodiments, the scout 100 has solar panels option, but being located on Earth, it is readily battery rechargeable. There are various commercial drones available that can fly for about half an hour and have to recharge by docking on the scout 100 or on the vehicle (e.g. tractor); they come with GPS and a rotatable camera 124 and a wireless communication system such as WIFI. The scout 100 weighs about 20-25 pounds and the drone 200 about 2-3 pounds. Example additional features of the ground scout 100 are shown in FIG. 1, such as a ground soil sample collector 134 or a solar panel 122 to charge batteries on the scout 100.

Figure 2:
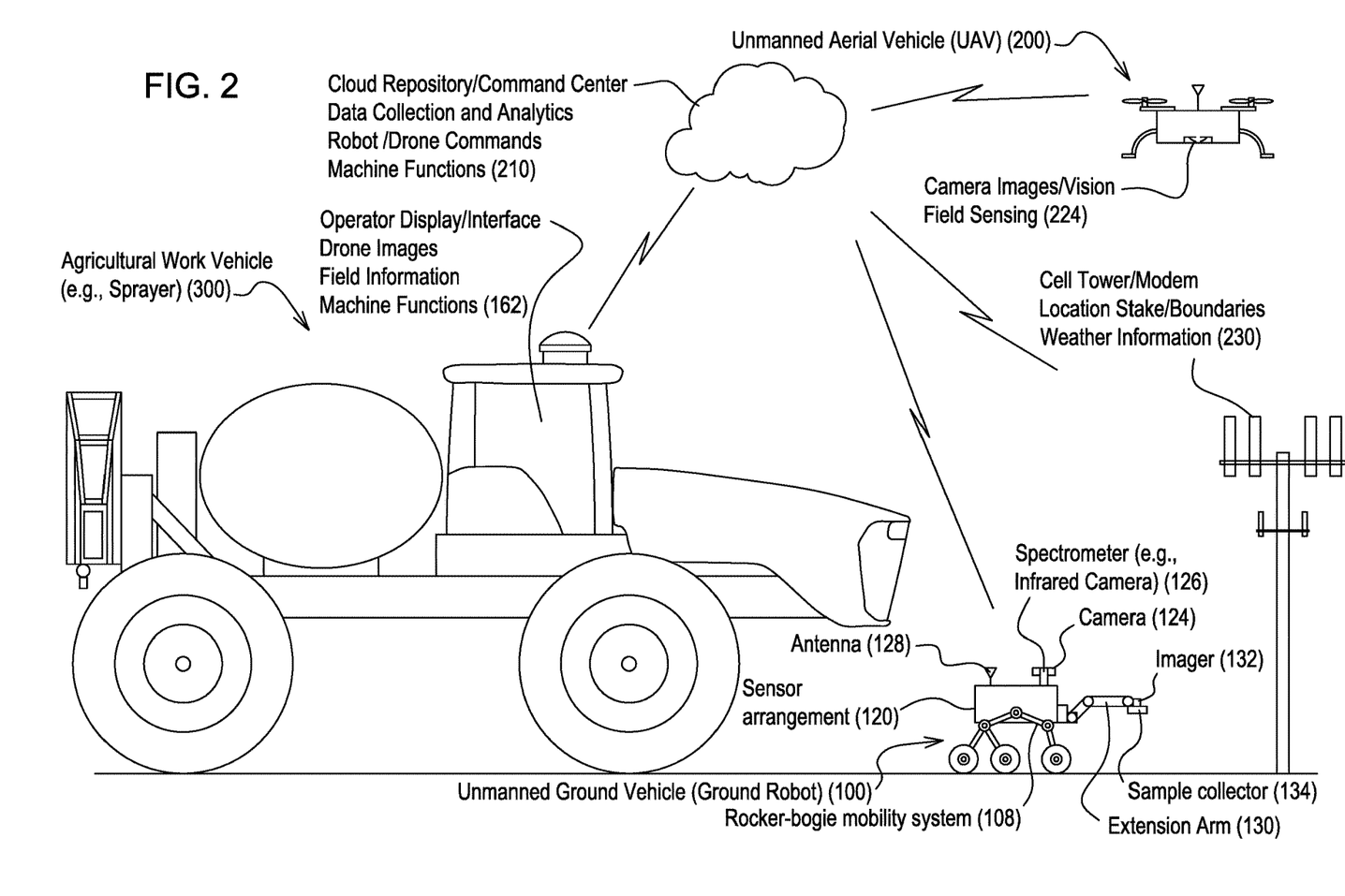
FIG. 2 depicts an example system for the scout and drone.

Embodiments of the communications include the following:

FIG. 2 depicts a buddy system having scout 100, drone 200, a vehicle 300 such as a sprayer or tractor (300), and possible offsite computer or cloud servers 210 or communication stations 230. In various embodiments, both scout 100 and drone 200 are equipped with wireless communication transmitter and receivers that are compatible with protocols such as 802.11 WIFI. Scout 100 and drone 200 communicate with each other or with the vehicle 300. Because scout 100 is on the ground and sometimes hidden from view or ability to view the terrain ahead of itself, the drone 200 performs an aerial survey and identify large patches of potential problems, common crops, farm boundary etc. An a priori (location) coordinate system is implemented for the farm site or field. Even in a situation where a scout 100 cannot see far ahead of itself, a drone 200 can and the drone 200 can determine where the scout 100 is in the coordinate system. The scout 100 transmits electronic signals, which is tracked by drone 200 to determine the scout 100's position in the agreed-upon coordinate system. A global coordinate system is relative to the Earth (e.g. a GNSS coordinate frame). A field coordinate system is relative to the current field of operation, which typically has particular characterizes such as crop row geometry. Finally, a local rest coordinate system is relative to the scout 100 itself. Because the scout 100 is typically within a few hundred yards and not far from the drone 200 or far from the vehicle 300, the scout 100 does not need to transmit a very strong signal for it to be detected. Either the drone 200 or vehicle 300 or farm site has antennas and may act as the wireless or even roving cellular tower and perform geolocation. Alternatively, there is an electronic guide post surrounding the farm field; the guide post effectively creates a field coordinate system by which to define the exact position of the ground scout 100, without the use of GPS. If a site is remote, GPS may not be available or not work reliably even above the crop's leaf canopy; then, a local field coordinate system is a good alternative.

In addition to the members of the buddy system, vehicle 300 or farm site communicating among themselves, a major task is to keep track of test samples and measurement data and correlating with the location. Any of these systems having WIFI protocol is also able to designate itself as a WIFI hotspot and become master or an access point to a wireless local area network or to the Internet in order to download climate and other information. In some embodiments, data is uploaded to and downloaded from a cloud server 210. For example, an agricultural sprayer uploads to the cloud server 210 data about its location, path planning, application prescription plan, current chemical solution and application rate. The scout 100 uploads crop data (e.g., crop type and crop variety). In addition, the drone 200 may also upload real-time data from a birds-eye view above and about the agricultural field. Analysis of the scout 100 or drone 200 data may indicate an area of crop that displays characteristics of disease or pest infestation. If further analysis is desired from the area of interest, the operator or drone 200 or vehicle 300 may identify a sampling location within the defined area as an optimal spot to direct the scout 100 to obtain additional data to determine crop health.

Figure 7:
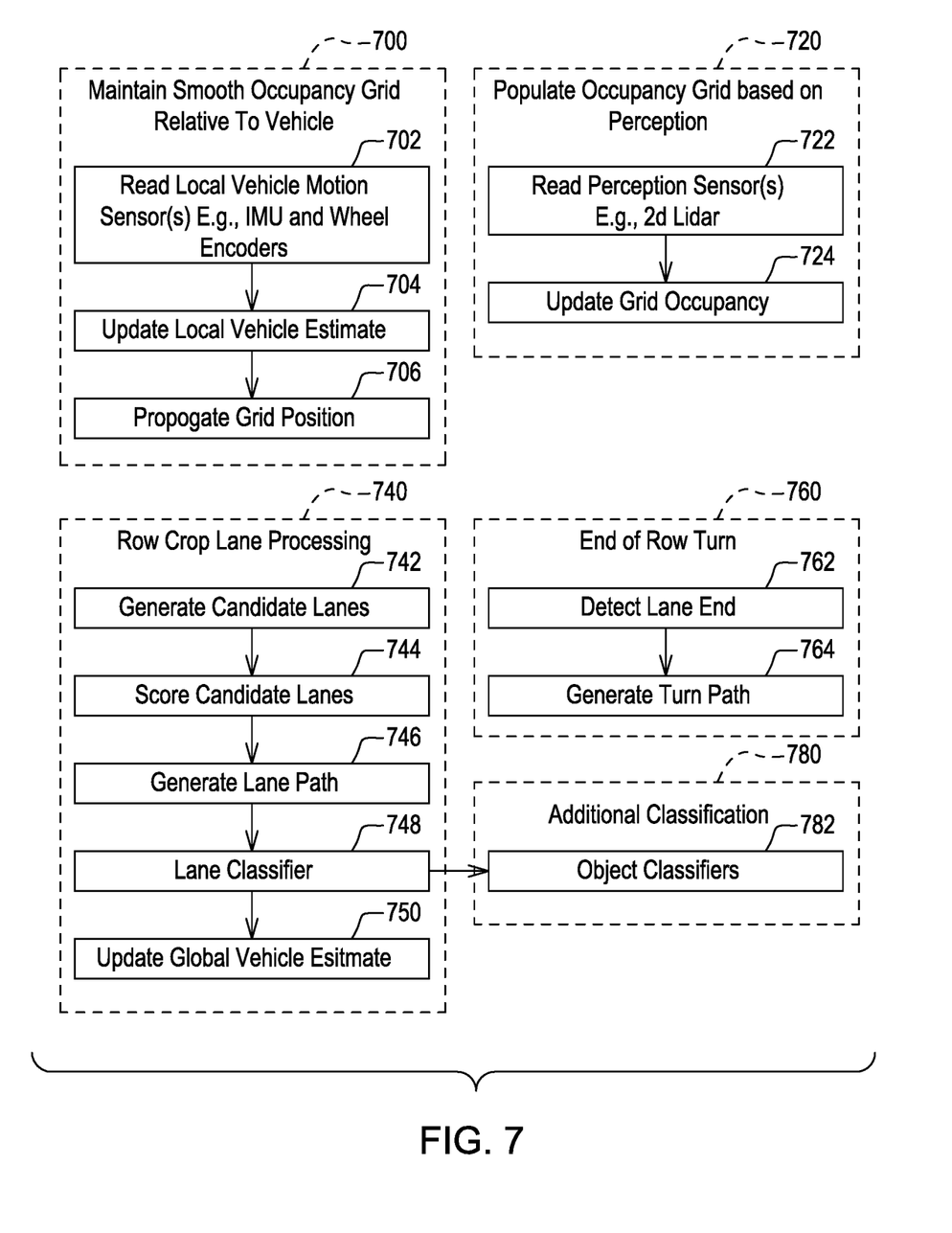
FIG. 7 depicts a flowchart of an example location identification.

Embodiments of the crop path and row identification include the following:

The path of the scout 100 or drone 200 is self-determining, but alternatively can be controlled by an operator or onboard computer 162. In a self-determining computer mode, FIG. 7 depicts a method by which scout 100 operates on its own to identify its own local position in the field. This may be done initially in the scout 100's own coordinate system ("occupancy grid"), and then transformed in an a priori agreed-upon coordinate system such as the local farm field grid or a more global Earth grid such as the one associated with GPS. The ground scout 100 constructs an occupancy grid that is parameterized by cell size. Scout 100 identifies where it is in the occupancy grid; its location and then the occupancy grid is transformed to another coordinate system such as the farm field grid. Alternatively, the farm field grid or GPS grid is first downloaded into the scout 100's memory so that it performs computations and mappings with respect to the farm or GPS grid. Regardless of which coordinate system is used, the method ascertains both a local motion of the scout 100 and a global motion, wherein the local motion is that of the scout 100 and a global motion is that of the scout 100 and surrounding objects. Eventually, scout 100 identifies optimal driving paths among the crop rows. Further, although, scout 100 may work with drone 200 to perform these tasks, it may also work independently especially at night time to collect data and provide a mapping. Scout 100 optionally carries a few battery packs or solar panels and thus can operate for a half day to a day, which is much longer than a drone 200 presently can (unless the drone is much larger). Further, when the crops have not grown so tall, or if the crops are of a short variety, the scout 100 has its own GPS system along with other sensors (e.g. 120) that help scout 100 to identify its own location using GPS or field guide posts, look ahead and so on, without collaborating with drone 200. Alternatively, scout 100 is used to guide the tractor or sprayer vehicle 300 in real time (or through a map) as to where to spray, which spray nozzles to turn on, where the ground has problems, where the soil becomes sandy, where a turn or boundary is precisely, and so on. With its rugged wheels 102 or in some cases, tank-like wheels 102, scout 100 can run ahead of or behind the vehicle 300 at a rate of 5-20 mph, which allows scout 100 to keep up with the tractor or sprayer.

Figure 8:
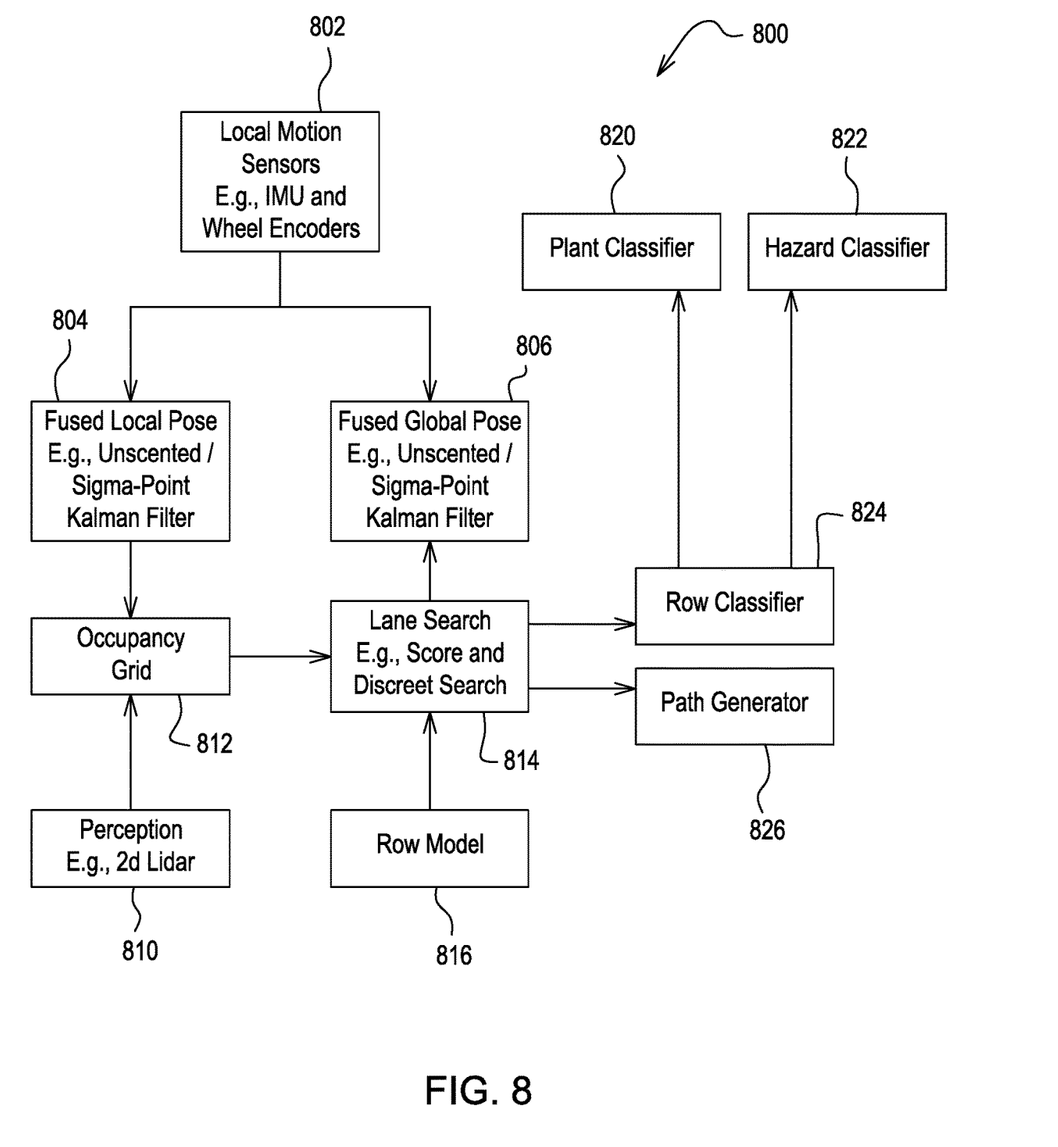
FIG. 8 depicts a flowchart of an example navigation operation.

In some method 800 embodiments as depicted in FIG. 8, using the occupancy coordinates, the ground scout 100 uses sensor fusion 804 to construct an occupancy grid 812 that is parameterized by cell size. For instance, perception sensor inputs are accumulated in 810 in the occupancy grid. Example perception sensors (e.g. in 120) include 2D lidar, 3D lidar, and stereo cameras 124 (visible or infra-red frequency for night time operation). The sensors 120 are mounted on scout 100 such that they can observe the crop leaves, stalks and ground under the canopy.

In various embodiments, the grid 812 is maintained in the reference frame of the ground scout 100's motion or local rest frame, in order to avoid distortions or sudden changes in position, which could corrupt the grid. The selected cell size represents a tradeoff between accuracy and processing efficiency. Each cell has an associated strength that indicates the confidence level of occupancy. In one embodiment method 802, the scout 100's wheel odometer information combined with its gyroscope output is used for local position estimation. As the ground scout 100 moves to a new position, the strength of the cells in the grid decays over time so that transient objects (e.g. insects, moving leaves, dust) are removed. Also the grid size is maintained with a predetermined distance around the scout 100 to optimize processing. An lane or row model (template) 816 is an example characterization for the grid, and navigation in the grid under the leaf canopy. The lane model includes parameters such as the row width, length, and heading direction, parameters which characterize the actual farm field having crops.

In one embodiment method as shown in FIG. 8, a set of candidate driving paths is generated in 826 and each candidate path is evaluated against the row model 816 (template) and the grid to produce a score. The path with the highest score is traveled by the scout 100. The scout 100 is able to localize itself in the field, given a map of the field that includes row widths, row lengths, and starting point. This can be correlated with or mapped to a geospatial map of the farm field.

In FIG. 8, the generated lanes form measurements that are fused together with other sensors 120 to localize the scout 100 within the row, and the scout 100 keeps track of its progress along the rows. After identifying the location, the scout 100 can then perform tasks such as mapping: tagging of crop quality data, hazard locations (e.g. ditch, rocks), moisture measurements or any other data that are of interest in the grid. Additionally, the process of finding the crop row also enables the identification of particular objects that are part of the row (e.g. in-liers) versus not part of the row (e.g. outliers) in example procedures 824, 820 an 822. This information is then optionally used to identify further classification (e.g. 820 and 822) or characteristics of these objects such as type of plant (e.g. weed) or hazardous objects.

Turning now to the various further embodiments of identification methods, FIG. 7 depicts example methods of the scout 100's identification operation and navigation as it travels along a crop row. Both the local motion (of the scout 100) and global motion (of the scout 100 and things surrounding the scout 100) are determined. The sensor data are obtained and the signals or data are filtered. A best fit to the data and estimate of the goodness of the fit are performed to identify the scout 100's location along with the occupancy grid. The methods are flexible and can accept different sensor inputs, use different row fitting methods, and/or can use different estimation methods for the location.

Regarding the data inputs, the method of row detection can accept perception sensor inputs including: 2d Lidar, 3d Lidar, and/or stereo vision. Other variables include any combinations of the following inputs for local scout 100 motion: wheel odometry and gyroscope with optional accelerometer and magnetometer, or other examples of motion sensors 121. Alternatively, the method uses lidar odometry with optional gyroscope, accelerometer, and magnetometer. Another combination includes visual odometry with optional gyroscope, accelerometer, and magnetometer. Any of these inputs can be used for identifying the scout 100's motion: row measurements, landmark measurements, GPS, local farm towers or the drone as a cell tower 230, farm grid posts, or the tractor or sprayer 300.

Regarding the filter, the filter estimates the local scout 100's motion using an Unscented/Sigma-Point Kalman filter (e.g. in 804, 806). Alternatively, the filter estimates come from using an Extended Kalman filter or a Particle filter. The filter estimates are used to construct an occupancy grid. The filter maintains a smoothing function or averaging to avoid distortions in the grid. The data for the grid is integrated using the filter's local frame estimates of the vehicle motion based on motion sensor inputs. The final grid that is obtained effectively filtered out noise such as transient returns and moving objects such as insects or leaves swaying in the wind.

A best fit to the series of data points and an estimate of the goodness of the fit are performed based on the grid information. The result can be transformed into any of the coordinate systems in use for both the local motion and the global motion. For example, a combination of the grid, row model, and one of the following methods is utilized to generate row measurements based on scoring and discreet search, a least squares fit, or a Chi-squared fit. The resulting lane or row grid includes the expected row width, row heading, and row length. The row measurement includes a heading vector relative to the row direction and a lateral offset relative to the lane center.

Along with the scout 100's local motion estimate, a separate filter estimates the scout 100's global motion using any of the following methods: Unscented/Sigma-Point Kalman filter, Extended Kalman filter, or Particle filter.

Regarding an example method 700 in FIG. 7, to maintain a smooth occupancy grid, a goal of the scout 100's local motion estimate includes maintaining an accurate estimate that does not jump suddenly or have a discontinuity, even in the presence of new global information that jumps suddenly. The occupancy grid is maintained in the local scout 100's (rest) frame so that the grid will not jump discontinuously. Discontinuous jumps may distort and/or smear the grid, causing errors in operation. Although the grid should not jump, objects within the grid do move and "jump." A goal of the scout 100's global motion estimate includes being as accurate as possible globally, and so a jump in the object's (e.g. vehicle 300) data would be considered "correct" behavior in the presence of new global information such as a row measurement or GPS reading. In method 700, the scout 100's motion sensors 121 (e.g. IMU and wheel encoders) are read out in 702 and the scout 100's position may be updated in 704. In 706, the scout 100's position in the occupancy grid is updated.

As the scout 100's local position estimates are updated in 704, the grid origin is correspondingly updated to properly reflect the scout 100's motion. Also the grid is aged over time in order to reduce the strength of any cells. Cells that are receiving new confirmation of occupancy from the perception sensor(s) (e.g. in 120) will avoid fading out of the grid. This removes transient returns such as blowing plants and dust.

Regarding an example method 720 of populating the occupancy grid based on perception, as a perception sensor (e.g. in 120) reading is received in 722, a sensor model is applied, and the corresponding cells in the occupancy grid are updated in 724. For example, an embodiment with a 2D lidar increases the confidence of occupancy at the point of the laser return. The grid cells may be implemented in various ways. One embodiment uses fixed cells with a parameterized size. The cell size is adjusted to increase accuracy with the use of additional processing and memory requirements. Alternately, the grid is appended as a quadtree or other data structure.

Regarding an example method 740 of row crop lane processing, for the scoring and discreet search method, candidate lanes are generated in 742 relative to the scout 100 and to any prior found lane lines. A configurable number of candidate lines are generated in a sweep of varying headings and lateral offsets. The candidates are scored in 744. A lane score is computed using for example the lane model that is parameterized by the row width, row length, plant thickness, and lane heading direction. For a candidate lane, points on the grid that fall in a region where one expects empty space are designated "bad," and points that fall in a region where one expects plants are designated "good." For a given lane, a score is calculated by summing applicable points in the grid (where good points are arbitrarily taken as being positive values, bad ones are negative values, and other points are zero) and multiplying each term by a corresponding grid cell weight. The weight or cell strength is based on the number of sensor readings that have occurred in each grid cell. The set of candidate lane lines near the ground scout 100 is then evaluated to find the line with the best score. In 746, a driving path is generated based on the identified best scoring crop row lane.

FIG. 7 depicts an example procedure 760 when the scout 100 reaches an end of the row and makes a turn. While the scout 100 is traveling, eventually it would reach an end of a crop row and would make a U-turn into the next row, or a "row turn." The best scoring lane candidate is evaluated against the row model for an end of row check. If an end of row is detected (e.g. based on vision sensor or lasers) in 762, a driving path is generated in 764 from the point of an end of row detection to the next desired row to be traveled by scout 100. As the scout 100 approaches the next desired row, the same row crop lane processing will take place as described above. When the best lane candidate reaches a score threshold, the scout 100 will then begin to travel the path based on that new row.

The drone 200 can use a method similar to that for scout 100 to identify crop rows in a large field. Alternatively, since drone 200 is above the canopy and has ready access to GPS or other wireless signals, its GPS identifies the drone 200's location. Image processing and sending information to an end-user or operator is one way to identify crop rows. Another way is to use visual pattern recognition techniques based on camera data.

Both the scout 100 and drone 200 have sensing, locomotive, calculation and communication properties so that they can identify their own locations in order to perform more complex tasks that can improve crop or plant yield. For instance, in FIG. 8, the scout 100 performs additional tasks including classifications (e.g. 820, 822, 824) and maps the class (send data on the location of a classified object or a classified condition). An object that is within the found row is considered an in-lier, and any object not part of the row is considered an outlier. The in-lier/outlier designation is an input to feed other classifiers to identify for example row crop plants, weed plants, and hazardous objects (e.g. 822). These candidates are then fed into specialized classifiers for plant identification (to separate plants from non-plants outside the row, and to separate weeds from crop plants in the row).

Figure 3:
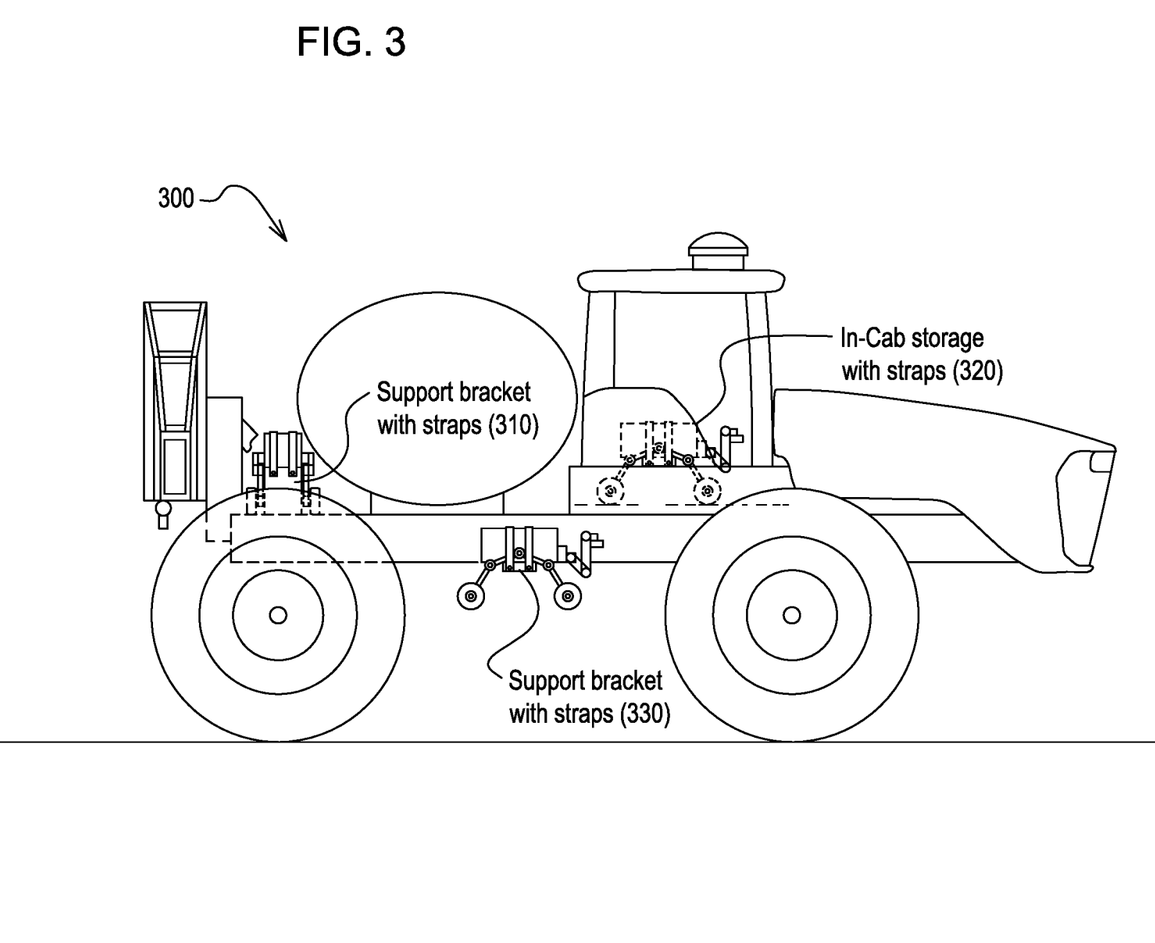
FIG. 3 depicts an example storage and docking for the scout and/or drone.
Figure 4:
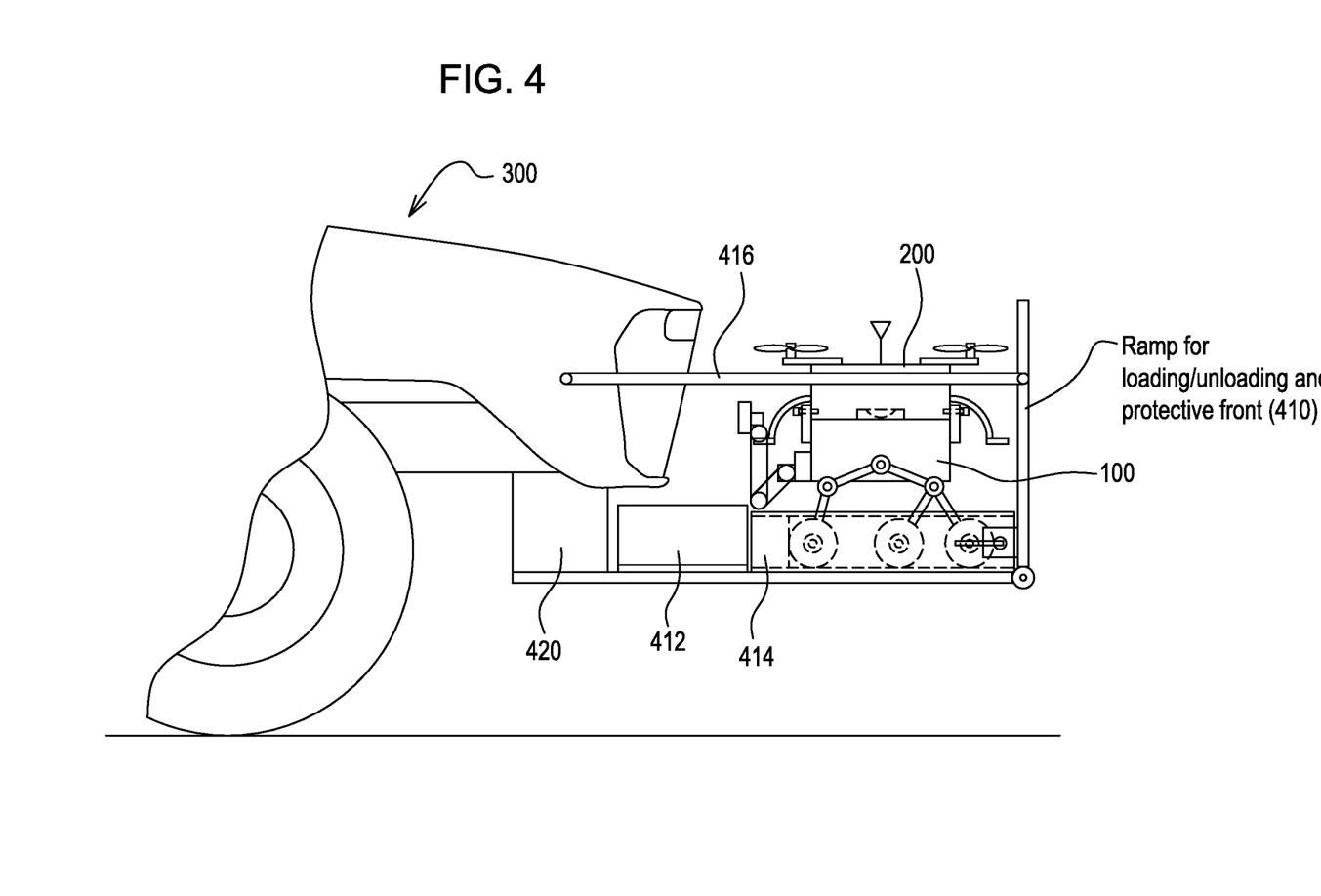
FIG. 4 depicts an example storage and docking for the scout and/or drone.

Embodiments of the power and docking systems include the following:

Both the scout 100 and the drone 200 need a source of power, either self-generated (e.g. solar panels) or received from external sources. A vehicle 300 or an agricultural machine (e.g., the sprayer, tractor, combine) that works with the scout 100 or drone 200, has the equipment to dock and charge the scout or drone. FIGS. 3 and 4 depict example methods of docking the scout 100 and drone 200 on a vehicle 300 or sprayer such that both also receive electric power to recharge the batteries on the scout 100 and drone 200. For example, FIG. 4 depicts docking in front of the vehicle 300 or sprayer, which enables the drone 200 to take off and fly without human assistance. Scout 100 is mounted to a shelf platform 412 extended out from front hood and fender similar to mounting objects in a basket in front of a bicycle or a rack in the back of a bicycle. To secure the scout 100, in some embodiments, the wheels 102 of scout 100 fit into the slots 430 on the shelf platform 412. Alternatively, scout 100 is hooked with straps 416 to the side hood; scout 100 is in front of the fender like on a bike rack. As yet another alternative, scout 100 is positioned on the floor but strapped (e.g. 310, 330) to a shelf or control bar in the cab of the vehicle 300 or sprayer (e.g. FIG. 3). FIG. 3 also depicts a scenario of the scout 100 being inside the cab (e.g. configuration 320; the figure is not drawn to scale). The cab and cab floor are often very spacious for larger farm equipment and scout 100 occupies only a small portion of the cab. In these example embodiments, an operator picks up the scout 100 from the field, then positions, and straps the scout 100 into the docking station such as shown in configuration 320. The scout 100 weighs less than about 25 pounds so that it is fairly readily loaded into place by humans. The docking station itself has an integrated electrical outlet (e.g. 424) or an extension cord is used to recharge the batteries on the scout 100. During storage, the drone 200 is docked on the scout 100 and power recharging is daisy-chained or the drone 200 is plugged into an electrical output on scout 100 (e.g. 512). During a field operation, drone 200 is optionally also docked on the scout 100 or drone 200 is stored in the cab of the sprayer or tractor. Drone 200 presently operates for a much shorter time period than scout 100 so that drone 200 is re-charged more often. In another example embodiment, drone 200 can also be re-charged independently by being plugged into the electrical plug that is used for the scout 100.

In other example embodiments, the docking arrangement (as shown in attached FIGS. 4-6) has a platform 412 that the ground scout 100 or drone 200 may travel to or fly to, respectively, or be manually placed upon. One can identify the location the platform 412 based on the relative GPS coordinates between the platform 412 and the scout 100 or drone 200. A more precise final loading is based on sight guides and vision-based guiding up a ramp 410 to position, or could also be accomplished with a beacon and laser based system that provides the guidance. The ground scout 100 is guided into "C"-shaped channels 426 with a forward stop on the platform 412 to retain scout 100 on the platform 412 during vehicle 300 travel. With this arrangement, as the channels support the scout 100 on the platform 412, open areas on the platform 412 under the scout 100 optionally allows for some ground sensing possibilities while in the docked state. The front ramp 410 pivots to a secured raised position to maintain the scout 100 in position and to provide for protection from objects as the vehicle 300 is traveling.

Figure 5:
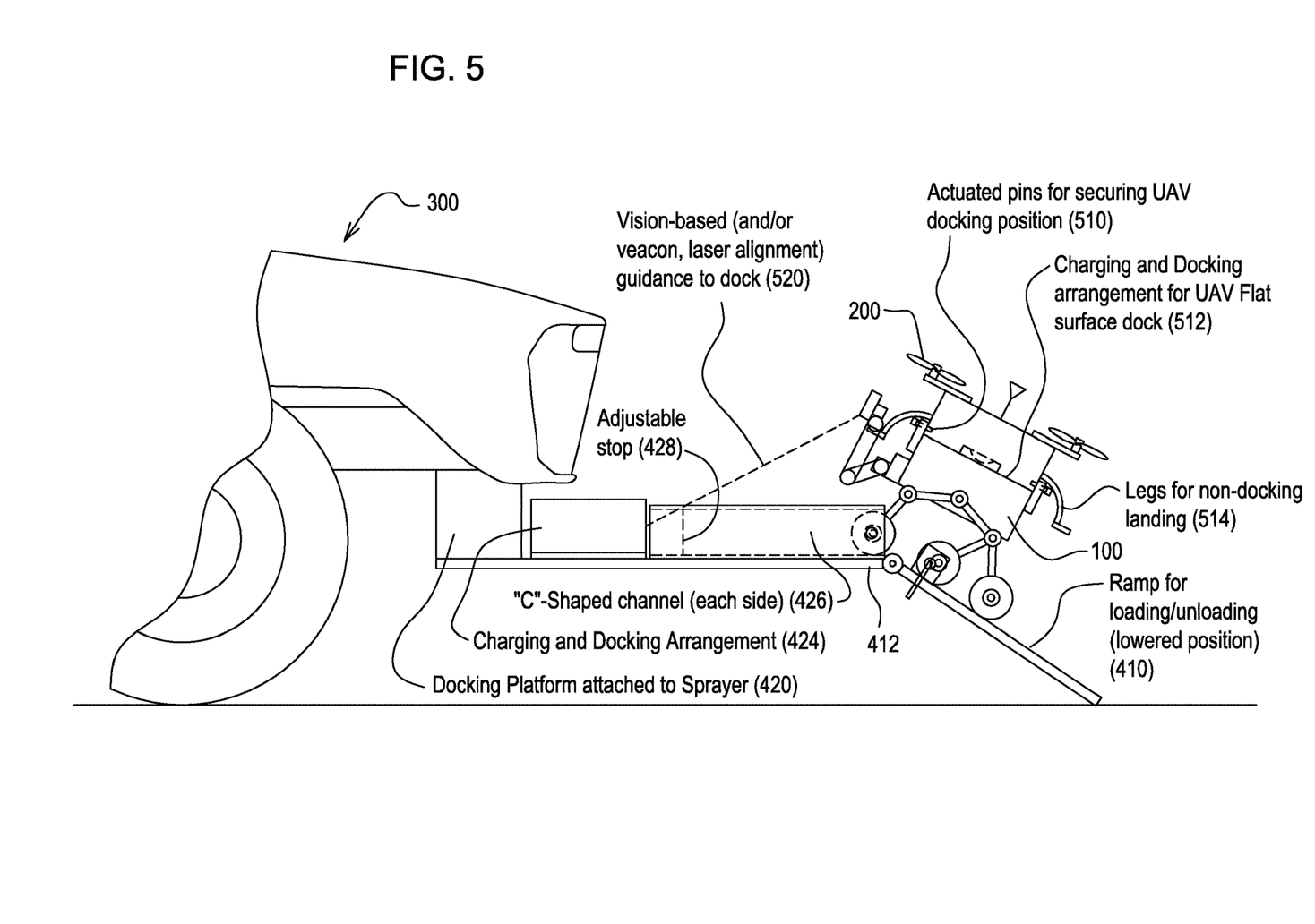
FIG. 5 depicts an example storage and docking for the scout and/or drone.
Figure 6:
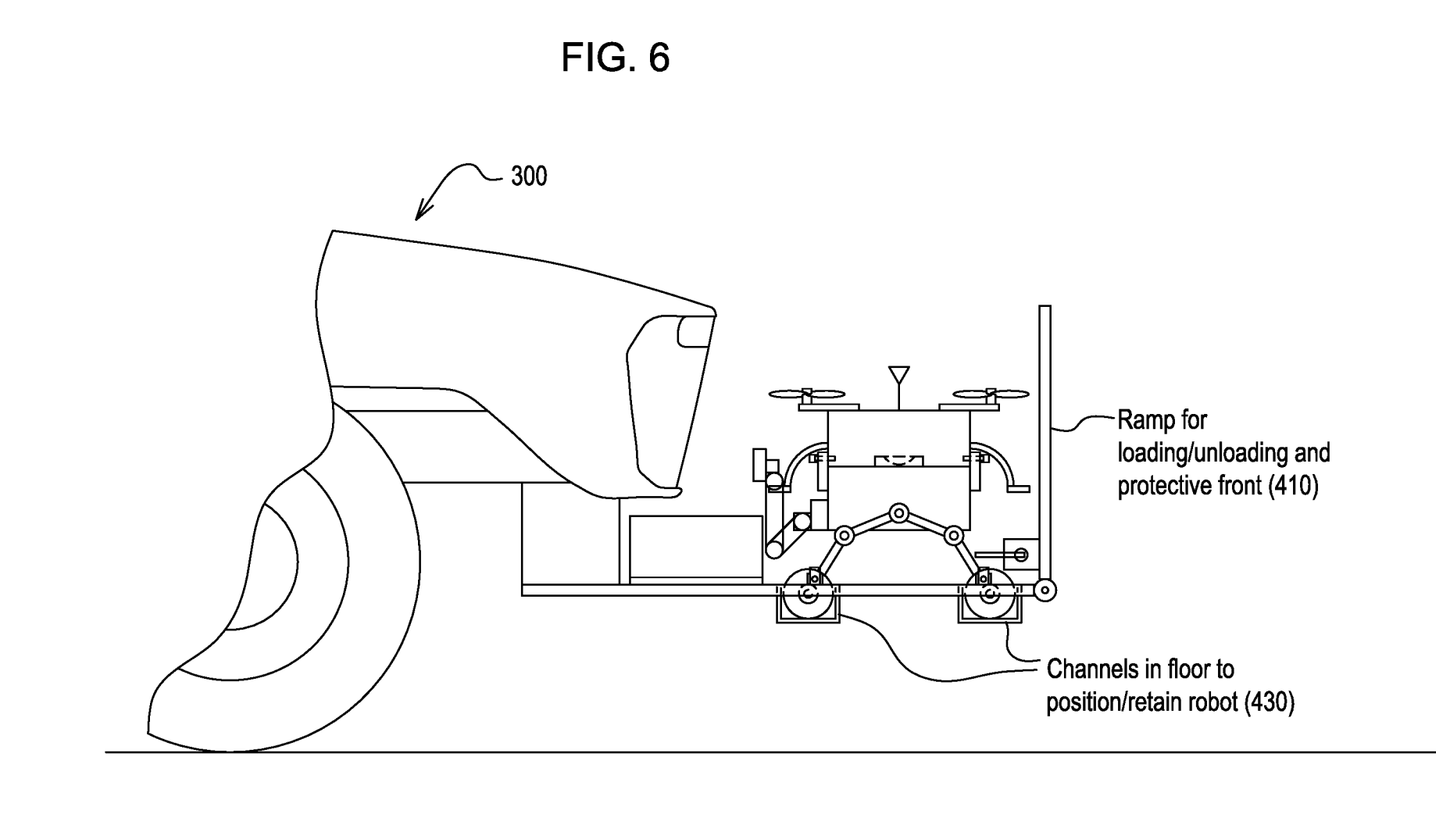
FIG. 6 depicts an example storage and docking for the scout and/or drone.

The example docking station and the scout 100 both have a flat top surface so that the drone 200 can be docked either on the docking station or on scout 100. Various communications, cameras (e.g. 124, 224) and other sensing arrangements 120 on both the scout 100 and drone 200 are recessible, collapsed or retracted during the docking process. Guidance for the drone 200 to a docking station atop of the ground based scout 100 may be performed through GPS and laser guidance, similar to the scout 100's guidance to the docking station, if the station is exterior to the sprayer or vehicle 300 or tractor. The drone 200 contains a pair of electronically actuated pins to secure the drone 200 to its docking location on top of the scout 100 or docking station. Alternatively, a machine operator manually connects all necessary charging connections to both the scout 100 and to the drone 200, and can also take additional steps (e.g., strapping) to secure both in their docking arrangement.

For very large fields or many scouts 100 and drones 200, docking and charging stations can be located in the field. Alternatively, a mobile docking and charging center is transported to a practical location for charging scouts 100 and drones 200. Otherwise, a machine-based docking station is arranged with a tractor, sprayer, combine harvester, and so on, as shown in the examples in FIG. 3.

Embodiments of the end-use applications include the following:

Endowed with various basic motor, senses and computational skills, there are an endless number of more complex tasks that the buddies or individual air or ground scouts can perform. In operation, such as in a field spraying, field data is collected by either or both the scout 100 and drone 200 and transmitted to an internet-based computing system (e.g., cloud computing server 210) or directly to a vehicle 300 following the scout 100 and drone 200. Alternatively, scout 100 and/or drone 200 follow after the vehicle 300 to monitor the spray or tillage or other activities conducted by the vehicle 300 (e.g. soil and residue monitoring). To analyze before and after effects, a scout 100 can run ahead of the vehicle 300 and another one can run behind. To avoid hazards, a scout 100 and drone 200 can detect objects (e.g. rocks, animals, abundance of residue), branches, ditches and warn the tractors or sprayer before the larger, costlier vehicles reach the dangerous location. A scout 100 is also suitable for detecting other types of hazards such as an overabundance of anhydrous ammonia in the atmosphere without the operator having to leave his sealed, protective cab of his vehicle 300.

Sensor and mapping arrangements for drone 200 and scout 100 include mapping for soil conditions, topography, obstacles, hazards, air/chemical sensing (e.g. nitrates), organic material, moisture, over spray conditions, contaminations, insects, crop condition, field and air conditions (e.g. residue, dry, wet conditions), and so on in order to improve crop yield per soil area. These tasks may be performed dynamically with the field vehicle 300 or sprayer, or a priori to a field operation. Alternatively, post operation monitoring and mapping are also useful to check the effects of a spray or tillage or other operation.

To accomplish mapping, sensors 120 are mounted to the drone 200 and scout 100, such as high-resolution cameras 124, 224, electromagnetic spectrum sensors 120 (e.g., visual spectrum, infrared), lasers, radar, biological and chemical sensors 120. For example, infrared cameras 124, 224 may detect variances in field plants that might indicate plant stress or insects. Biological sensors (e.g. in 120) can be used to detect soil or airborne presence of various microorganisms and other biological factors. Chemical sensors (e.g. in 120) may detect soil or airborne elements. Both the path of the scout 100 or drone 200 is self-determining, but alternatively can be controlled by an operator or onboard computer 162 with an established path, but can be modified at any time by the computing system, the operator of the agricultural machine operator or by some other person.

The data collected are transmitted to a data processing system such as a cloud (see FIG. 2), vehicle 300 computer 162 or farm site or other operation center. The data processing system is part of a cloud server 210 repository/command center that collects and analyzes the transmitted data. If any of a number of values of sensed field conditions is identified as outside of an expected range, it may be desired to gather further information with a ground based analysis. In these instances, the computing system sends a command or an alert to the operator or may even dispatch another autonomous machine to a desired location to perform a desired task.

If the crop (e.g., a row crop such as corn) is mature enough so that a canopy restricts the scout 100 from receiving a wireless signal during its route, then the row identification and navigation system allows the scout 100 to travel to a predetermined location or some other location outside of a canopied row so as to reestablish a connection to the computing system for further instructions. Alternatively, scout 100 stores its collected data in memory until it can synchronize with a central operation system.

One example operation is a cloud server 210 computing system that receives data from an agricultural sprayer (such as location, path planning, application prescription plan, current chemical solution and application rate). The computing system may also receive crop data (e.g., crop type and crop variety) from an operations database. In addition, the computing system optionally receives real-time data from drone 200 above the agricultural field. Analysis of the drone 200 data may indicate an area of crop that displays characteristics of disease or pest infestation. If further analysis is desired from the area of interest, then the computing system will identify a sampling location within the defined area as an optimal spot to direct scout 100 so as to obtain additional data to determine crop health (e.g. moisture sensor, gas chromatograph sensor). This ground sampling location is based on factors such as the current location of the scout 100, field characteristics of the defined area and the field characteristics of potential routes of the scout 100. The data collected from the scout 100 at the sampling location is then transmitted to the computing system for analysis. Computing algorithms will determine if machine adjustments should be made to the sprayer rate, or spray solution based on the field conditions. For instance, the machine adjustments are presented to the machine operator on an operator display/interface. The adjustments may be performed automatically (unless modified or overridden by the operator) or presented to the operator as a recommendation. And, by combining field mapping of the affected areas with sprayer location information, the machine adjustments can be made specifically to only cover the identified areas.

For additional sampling practices, the scout 100 has an extension arm to allow for the physical collection of samples of soil or biological items. The scout 100 may also contain various cameras 124 and spectrometers, and have a sensor arrangement that is expandable to allow for additional sensor inputs. In embodiments where there are multiple scouts 100, then the computing system would be able to determine the best available scout 100 to direct to a field site based on proximity, terrain and obstacles, pre-directed tasks, and other criteria.

In an embodiment involving buddy tasks, the computing system may coordination the operations of the drone 200(s) and scout 100(s) to collect the field data before the agricultural operation (e.g., spraying) is started. The collection of field data may commence with an area that is planned for an initial route of the agricultural operation and then "work ahead" along a path plan of the agricultural operation. Or the collection of field data may be completed before the start of the agricultural operation. In any case, the analysis of the field data creates or modifies a geo-referenced prescription plan for the agricultural operation (e.g., a sprayer application rate or solution). Regardless, many tasks are possible after the scout 100 and drone 200 have a set of basic abilities as presented above.

Some of the example main features of the scout-drone combination include the following. The ground scout 100 can use a combination of perception sensors (e.g. in 120) and motion sensors 121 to construct an occupancy grid that is referenced to the scout 100's frame of motion. The occupancy grid cell size can be varied to trade off computational requirements for operational accuracy. Larger grid cells involve less computation, but have reduced operational accuracy. Smaller cells include more computation but provide greater operational accuracy. The ground scout 100 has the ability to use the information in the occupancy grid to detect crop rows. The crop row identification includes a comparison based on comparing the occupancy grid contents with the geometry of the crop field (i.e. the lane or row model or template). For example, the row model includes the expected values of the width of the crop row, the length of the crop row, and the expected plant spacing.

Example applications include the following. The detected crop rows can be used to identify objects that are not part of the crop rows. For example, weeds can be identified as plants that are not part of the crop row. The ground scout 100 can localize itself in the field based on the occupancy grid and known geometry. The ground scout 100 can translate the field coordinates to a global (GPS) coordinate frame, given an a priori mapping of the field on the Earth, such as would be produced by a survey (e.g. prescription maps). The drone 200 can maintain an estimate of its own position in the global coordinate frame and also within the field coordinate frame. The drone 200 and the ground scout 100 can communicate their location estimates to each other. The drone 200 can estimate the position of the ground scout 100 in both the global and field coordinate frames, and can communicate this estimate to the ground scout 100. The ground scout 100 can utilize measurements taken by the drone 200 of the ground scout 100 to further enhance its estimation of its own position within the field, which would also result in a more accurate estimate of location in the global frame. The ground scout 100 can utilize the global estimate of the drone 200 to improve its position estimate in the global frame. These features aid in improving crop yields, yield estimation, crop counting, study and analyze crops versus the environmental or soil conditions. With additional tools or using a tool similar to the soil sampler, the ground scout 100 may also plant specific seeds or introduce specific chemicals in a designated or chosen location.

Although the focus of this disclosure is on autonomous, self propelled robots or drones, some of the algorithms can be transferred to bigger machines such as a sprayer motor vehicle to help the operator to automatically identify rows, perform automated row and end-row guidance without the operator performing the maneuvers manually or watching the field.

Finally, the orientation and directions stated and illustrated in this disclosure should not be taken as limiting. Many of the orientations stated in this disclosure and claims are with reference to the direction of travel of the equipment. But, the directions, e.g. "behind" can also are merely illustrative and do not orient the embodiments absolutely in space. That is, a structure manufactured on its "side" or "bottom" is merely an arbitrary orientation in space that has no absolute direction. Also, in actual usage, for example, the drones may perform pitches, yaws or rolls in which case "top" may be pointing to the side or upside down. Thus, the stated directions in this application may be arbitrary designations.

In the present disclosure, the descriptions and example embodiments should not be viewed as limiting. Rather, there are variations and modifications that may be made without departing from the scope of the appended claims.

What is claimed is:

1. A scouting system comprising:
    an autonomous ground vehicle having a perception sensor and a motion sensor to construct an occupancy grid;
    wherein the occupancy grid is referenced to a coordinate system of the autonomous ground vehicle;
    the autonomous ground vehicle is configured to use information from the occupancy grid to detect crop rows in a crop field, based on a comparison of contents of the occupancy grid with a geometry of the crop field;
    wherein the geometry includes at least one of an expected width of the crop rows, an expected length of the crop rows, and an expected crop plant spacing;
    a vehicle driving path is generated for the autonomous ground vehicle, wherein the vehicle driving path is based on the comparison of contents for candidate crop rows; and
    wherein the autonomous ground vehicle is configured to identify and classify one or more non-crop plant in-lier objects arranged within the crop rows and to generate an output signal received by an external vehicle to cause the external vehicle to perform a task when the one or more non-crop plant in-lier objects are identified within the crop rows.

2. The scouting system of claim 1, wherein a strength of cells in the occupancy grid is determined from a number of sensor readings that fall in a region where crop plants are expected; and wherein the occupancy grid is obtained after filtering out noise and transients.

3. The scouting system of claim 1, wherein the autonomous ground vehicle classifies weeds or hazardous objects from crop plants based on whether an object is an in-lier or outlier within a found crop row.

4. The scouting system of claim 1, wherein the autonomous ground vehicle travels behind or ahead of a tractor or a sprayer vehicle and is in communication with the tractor or the sprayer vehicle to monitor spraying or to guide spraying.

5. The scouting system of claim 4, wherein the autonomous ground vehicle transforms the coordinate system to a farm field coordinate system or to an Earth coordinate system to identify a location of at least one of an end-row, a weed, a hazardous object, and a ground moisture.

6. The scouting system of claim 1, wherein the autonomous ground vehicle is in communication with an aerial drone; wherein the autonomous ground vehicle performs ground tasks and the aerial drone performs a crop surveillance; and wherein the ground tasks include at least one of soil sampling, moisture sensing, weed identification, and hazard object identification; and wherein the crop surveillance includes at least one of identification of damaged crops and notification to the autonomous ground vehicle.

7. The scouting system of claim 1, wherein the autonomous ground vehicle is in communication with an aerial drone; and wherein the autonomous ground vehicle and the aerial drone are docked together on an agricultural vehicle that provides a power source.

8. The scouting system of claim 1, wherein perception sensor includes one of a lidar and a camera that provides data to populate the occupancy grid; and wherein the motion sensor propagates a position of the autonomous ground vehicle in the occupancy grid.

9. A method to scout an agricultural field, the method comprising:
constructing an occupancy grid for an autonomous ground vehicle having a perception sensor;
referencing the occupancy grid to a coordinate system of the autonomous ground vehicle;
using information from the occupancy grid to detect crop rows in a crop field, based on a comparison of contents of the occupancy grid with a geometry of the crop field; wherein the geometry of the crop field includes at least one of an expected width of the crop rows, an expected length of the crop rows, and an expected crop plant spacing;
generating a vehicle driving path for the autonomous ground vehicle, wherein the vehicle driving path is based on the comparison of contents for candidate crop rows; and
identifying and classifying one or more non-crop plant in-lier objects arranged within the crop rows and generating an output signal received by an external vehicle to cause the external vehicle to perform a task when the one or more non-crop plant in-lier objects are identified within the crop rows.

10. The method of claim 9 further comprising using a motion sensor to help construct the occupancy grid; populating the occupancy grid with data from the perception sensor, wherein the perception sensor includes one of a lidar and a camera; and; using the motion sensor to propagate a position of the autonomous ground vehicle in the occupancy grid.

* * * * *